US012559352B2

(12) United States Patent
Näslund et al.

(10) Patent No.: US 12,559,352 B2
(45) Date of Patent: Feb. 24, 2026

(54) CONTROLLER AND SYSTEM FOR SIMULATION OF CRANE OPERATION

(71) Applicant: Olsbergs Electronics AB, Vallentuna (SE)

(72) Inventors: David Näslund, Vallentuna (SE); Jan-Erik Steen, Vallentuna (SE)

(73) Assignee: OLSBERGS ELECTRONICS AB, Vallentuna (SE)

( * ) Notice: Subject to any disclaimer, the term of this patent is extended or adjusted under 35 U.S.C. 154(b) by 146 days.

(21) Appl. No.: 18/467,546

(22) Filed: Sep. 14, 2023

(65) Prior Publication Data

US 2024/0092615 A1      Mar. 21, 2024

(30) Foreign Application Priority Data

Sep. 15, 2022    (SE) .................................... 2251066-3

(51) Int. Cl.
B66C 13/40         (2006.01)
G05B 17/02         (2006.01)
(Continued)

(52) U.S. Cl.
CPC .............. B66C 13/40 (2013.01); G05B 17/02 (2013.01); G06F 3/02 (2013.01); G08C 17/02 (2013.01); G09B 9/05 (2013.01)

(58) Field of Classification Search
CPC ........... B66C 13/40; G05B 17/02; G06F 3/02; G08C 17/02; G09B 9/05
See application file for complete search history.

(56) References Cited

U.S. PATENT DOCUMENTS 10,495,880 B2    12/2019    Rantala
11,208,301 B2    12/2021    Krebs et al.
(Continued)

FOREIGN PATENT DOCUMENTS

CN        101419756 A      4/2009
CN        213581779 U      6/2021
(Continued)

OTHER PUBLICATIONS

European Search Report for U.S. Appl. No. 23/197,719 completed on Feb. 1, 2024 (2 pages).

*Primary Examiner* — Hitesh Patel
*Assistant Examiner* — Joshua Jeffrey Penko
(74) *Attorney, Agent, or Firm* — Husch Blackwell LLP

(57)        ABSTRACT

A controller for controlling the operation of a crane has a control panel for the control of different functions of the crane, a two-way communication radio unit adapted to transmit and receive information from/to the controller, and a processing means connected to the control panel and the communication radio unit and adapted to control the function of the controller. The processing means, when in an operation mode, is adapted to communicate with the crane for controlling the operation of the crane, and when in a simulation mode, is adapted to communicate via the communication radio unit with a remote simulator device adapted to simulate the operation of a predefined crane. The communication radio unit is adapted to operate in the 2.4 GHz Bluetooth band. The same controller can thereby be used for both operation in the field and for a learning process.

8 Claims, 3 Drawing Sheets

(51) Int. Cl.
   G06F 3/02        (2006.01)
   G08C 17/02       (2006.01)
   G09B 9/05        (2006.01)

(56)                References Cited

U.S. PATENT DOCUMENTS

| | | | |
|---|---|---|---|
| 2008/0165025 A1* | 7/2008 | Morath | B66C 13/40 |
| | | | 340/4.36 |
| 2018/0252921 A1* | 9/2018 | Rantala | G06F 3/0487 |
| 2019/0019430 A1 | 1/2019 | Steib et al. | |
| 2019/0284027 A1 | 9/2019 | Albrecht | |
| 2020/0223671 A1 | 7/2020 | Bregmayr et al. | |
| 2021/0139293 A1 | 5/2021 | Palberg et al. | |
| 2021/0236917 A1* | 8/2021 | Palmer | A63F 13/235 |

FOREIGN PATENT DOCUMENTS

| | | |
|---|---|---|
| KR | 19980044037 | 9/1998 |
| KR | 20170072376 A | 6/2017 |
| WO | 2020058569 A1 | 3/2020 |

* cited by examiner

1

100

1

200

1

3 5

7 9 11

13

CONTROLLER AND SYSTEM FOR SIMULATION OF CRANE OPERATION

TECHNICAL FIELD

The present invention relates generally to simulation and more particularly to a controller and a system for simulation the operation of a crane, in which the controller is operable both as a controller for controlling the operation of a crane and as part of a system for simulating such an operation.

BACKGROUND

A portable controller is normally used for controlling the functions of a machine, such as a mobile crane. Presently, these controllers are normally radio-controlled, enabling the operator of for example a mobile crane to control and supervise the various operations of the crane from a desired distance and to move freely thereabout.

Operating a mobile crane is very complex, requiring long time of practicing before the operator is skilled enough to perform these operations.

Simulators for simulating the operation of a crane are known. However, these are expensive and do not lend themselves for easy access.

SUMMARY

An object of the present invention is to provide a controller and a system which mitigates the problems associated with long-time learning process of operating a crane.

The invention is based on the insight that the same controller can be used for both operation in the field and for a learning process.

Thus, according to a first aspect of the invention, there is provided controller for controlling the operation of a crane, comprising: a control panel for the control of different functions of the crane, a two-way communication radio unit adapted to transmit and receive information from/to the controller, and a processing means connected to the control panel and the communication radio unit and adapted to control the function of the controller, wherein the processing means, when in an operation mode, is adapted to communicate with the crane for controlling the operation of the crane, the controller being characterized in that the communication radio unit is adapted to operate in the 2.4 GHz Bluetooth band, and that the processing means, when in a simulation mode, is adapted to communicate via the communication radio unit with a remote simulator device adapted to simulate the operation of a predefined crane.

By means of a controller according to the invention, the long-time learning process of operating a crane can be accomplished without the need for a dedicated simulator, lowering the costs for a simulation feature. Instead, the only device needed besides a controller, which is needed anyway for the operation of a crane, is a simulator device in the form of a standard computer, a pair of VR glasses, or similar computerized means. The look and feel of the controller which is used daily for controlling a real crane is also more authentic than a dedicated simulator used only for simulation purposes.

In a preferred embodiment, the communication radio unit is adapted to communicate according to the Human Interface Device (HID) protocol.

In a preferred embodiment, the processing means, when in the simulation mode, makes use of Generic Attribute profile (GATT-profile).

In a preferred embodiment, a second communication radio unit is provided, wherein the processing means is adapted to communicate with the crane during operation thereof by means of the second radio communication unit.

According to a second aspect of the invention, a system for simulating operation of a crane is characterized by a simulator device comprising a radio communication unit (209) adapted to operate in the 2.4 GHz Bluetooth band, and a controller according to the invention adapted to communicate with the simulator device.

In a preferred embodiment, the simulator device is a computer. Alternatively, the simulator device is a pair of virtual reality (VR) glasses.

According to a third aspect of the invention, a method of operating a controller for controlling the operation of a crane by means of a controller is provided, the method comprising the following steps: a) setting the controller in one of the following modes: an operating mode and a simulation mode, b) if the controller is in the operating mode, controlling the operation of the crane, and c) if the controller is in the simulation mode, communicating with a simulation device for simulating the operation of a predefined crane.

According to a fourth aspect of the invention, computer program comprising computer program code is provided, the computer program code being adapted, if executed on a processor of the processing means of a controller according to the invention, to implement the method according to the third aspect of the invention.

According to a fifth aspect of the invention, computer program product comprising a computer readable storage medium is provided, the computer readable storage medium having the computer program according to the fourth aspect of the invention.

BRIEF DESCRIPTION OF THE DRAWINGS

The invention is now described, by way of example, with reference to the accompanying drawings, in which.

DETAILED DESCRIPTION

In the following, a detailed description of a controller for controlling the operation of a crane and a system for simulating operation of a crane will be given with reference to the figures.

Figure 1:
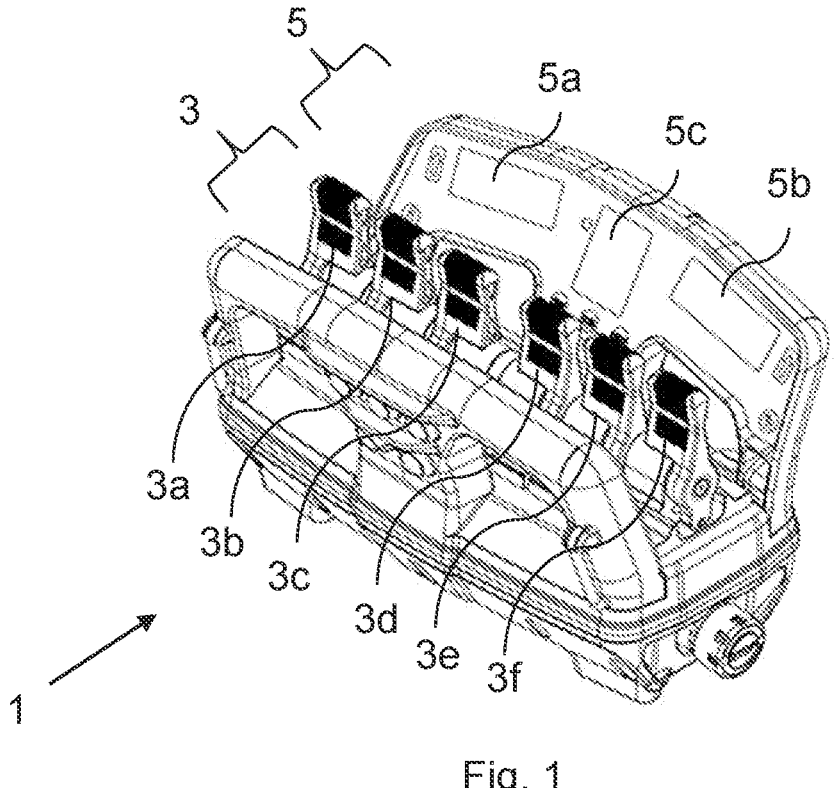
FIG. 1 schematically shows a perspective view from above of a controller according to the present invention.
Figure 2:
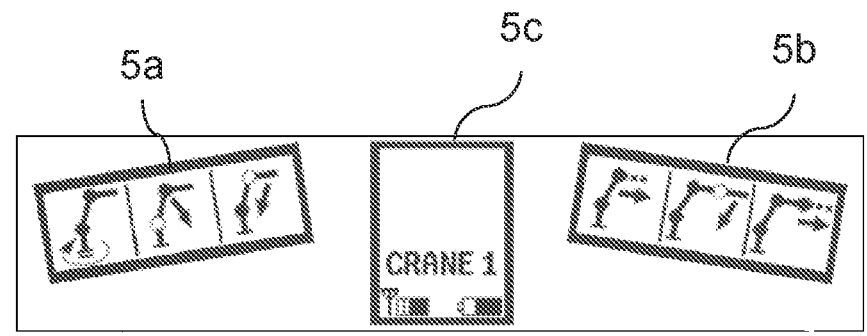
FIG. 2 shows an explanatory front view of a display panel of the controller of FIG. 1.

A portable controller, generally designated 1, for the control and supervision of functions of a remote device, such as a crane, particularly a mobile crane, is illustrated in FIG. 1. A controller according to this embodiment is adapted for two-way radio control. However, the crane may alternatively be remotely controlled via a cable or a wire.

According to the embodiment shown in FIG. 1, the controller 1 comprises a control section 3 comprising six manual control members or levers 3a-3f. However, it will be appreciated that a controller according to the invention can have fewer or more than six control members. These control members are adapted for the control of the different functions of a crane. Thus, the control members 3a-f are preferably designed as a row of levers, capable of forward and backward movement in one direction for the control of a function. Obviously, the control members may be of a different type or have a different design, such as joysticks. Each control member 3a-f is electrically connected to a display panel, generally designated 5 for indicating a selected, active function. In the shown embodiment, three screens 5a-c, preferably electro-optical screens, are electrically connected to the control members 3a-f. Each of the control members 3a-f is arranged to control one or more functions, which preferably are included in separate functional groups and each one referred to as a menu.

Figures 3, 4, 5:
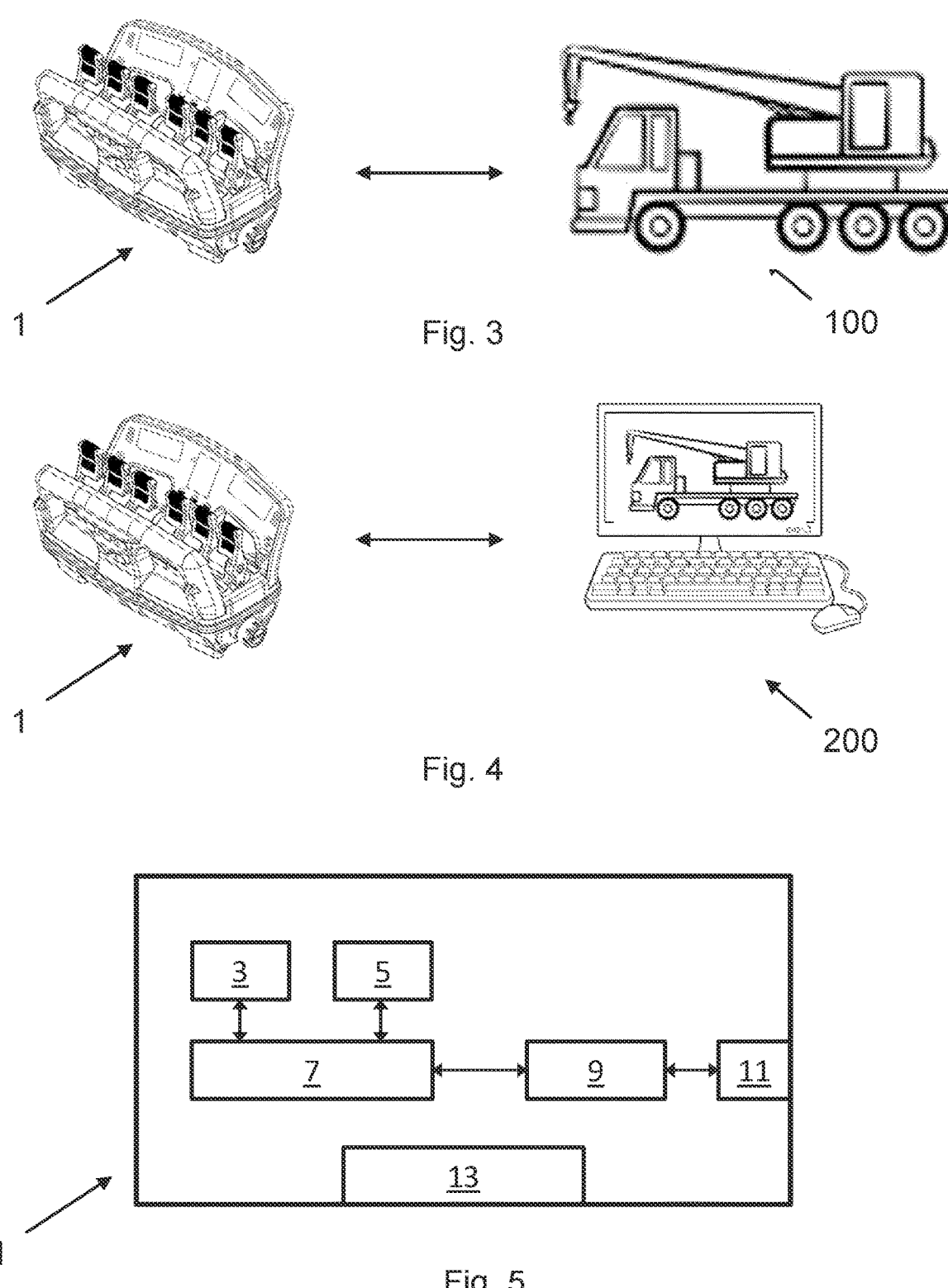
FIG. 3 is a schematic view showing the communication between a controller according to the invention and a mobile crane.
FIG. 4 is a schematic view showing the communication between a controller according to the invention and a computer during simulation of a crane operation.
FIG. 5 is a block diagram showing the different components of a controller according to the invention.

The communication between the controller 1 and a crane 100 in the form of a mobile crane is schematically shown in FIG. 3. The crane 100 is provided with a radio receiver (not shown) comprising a unit to handle radio communication at the crane end. It is preferred that the communication is by radio frequency (RF) communication by means of a communication radio, but communication by means of wire with the crane 100 is also possible. By means of this communication, an operator can control the operation of the mobile crane 100 using the controller 1.

As mentioned in the background section, operating a crane is a very complex task, requiring long time of practicing before the operator is skilled enough to perform these operations. To allow for safe practicing, the controller 1 according to the invention comprises processing means which, when in a simulation mode, is adapted to communicate via the communication radio with a remote simulator device adapted to simulate the operation of a predefined crane. In FIG. 4, this is schematically shown with a controller 1 communicating with a simulator device in the form of a computer 200.

The design of a controller 1 according to the invention is shown in FIG. 5 by means of a block diagram. The control section 3 and the display panel 5 are connected to a processing unit 7 adapted to control the different functions of the controller 1. The processing unit 7 comprises a processor and a memory for storing a computer program. The processing unit 7 controls the operation of a radio communication unit 9, adapted to operate in different RF bands, such as within the 868-915 MHz band. The radio communication unit 9 is also adapted to operate in the 2.4 GHz Bluetooth band. The radio communication unit 9 is in turn connected to an antenna 11, by means of which the controller 1 can communicate with remote objects, such as the crane 100 or a computer functioning as a simulator device 200. A battery 13 is preferably provided in the controller 1 for powering the different components thereof. Optionally, the controller 1 can be powered by means of an external power source connected to the controller 1 by means of an electric cable.

It is preferred that the radio communication unit 9 is adapted to communicate according to the Human Interface Device (HID) protocol, which is a Bluetooth standard for gaming applications. The standard is designed to provide a low latency link, with low power requirements. The use of the HID protocol simplifies host implementation, for example support by operating systems, by enabling the re-use of some of the existing support for USB HID to also support Bluetooth HID. This means for example that the controller 1 can appear as a joystick to a remote device, such as a computer.

It is preferred that the controller makes use of Generic Attribute profile (GATT-profile) which defines the way that two Bluetooth Low Energy devices, in this case the radio communication unit 9 and the computer 200, transfer data back and forth using concepts called Services and Characteristics.

Figure 6:
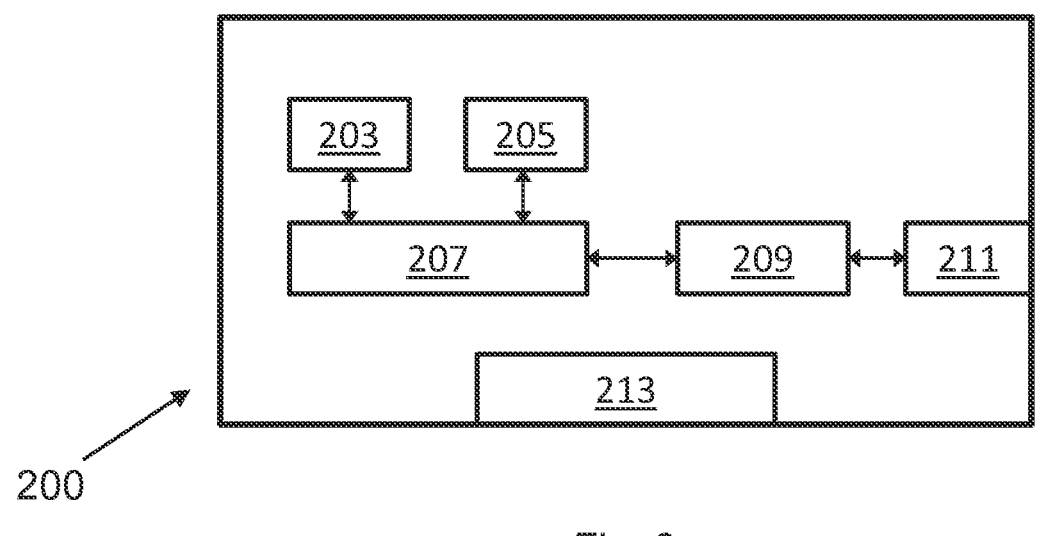
FIG. 6 is a block diagram showing the different components of a simulator device comprised in a system for simulating operation of a crane according to the invention.

Turning now to FIG. 6, the simulator device in the form of a computer 200 comprises a processing unit 207 adapted to, during operation, communicate with a display device 205. The processing unit 207 comprises a processor and a memory for storing a computer program. The function of the display device 205 is to show a virtual crane during simulation of the operation of a crane. The computer usually comprises some kind of input device, such as a keyboard 203. The processing unit 207 also controls the operation of a radio communication unit 209, which during simulation communicates with the controller 100 via an antenna 211. The simulator device is powered by means of a battery 213 or by being connected to a power network.

It is preferred that simulation software used by the computer 200 can be downloaded from the Internet, such as from a home page of a provider of controllers and cranes.

Thus, a system for simulating operation of a crane comprises a simulator device, such as a computer 200 comprising a radio communication unit, and a controller 1 which is adapted to communicate with the simulator device besides its function to control the operation of the crane 100.

Figure 7:
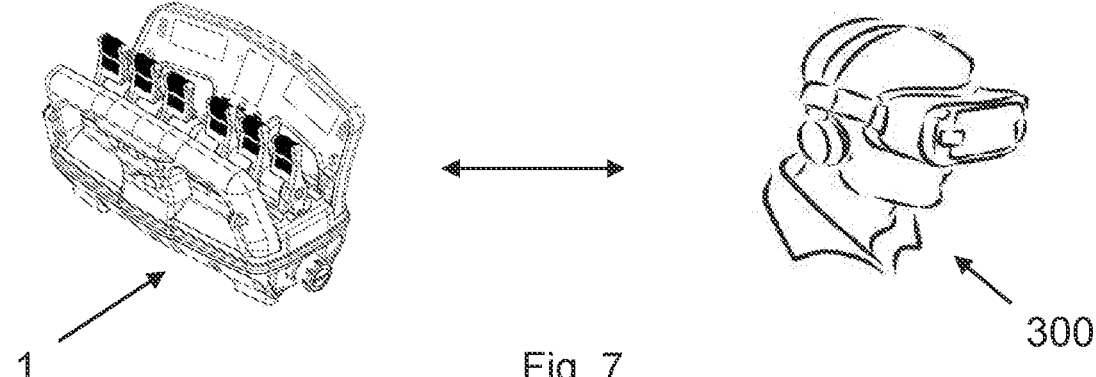
FIG. 7 is a schematic view showing the communication between a controller according to the invention and a pair of virtual reality glasses during simulation of a crane operation.

In an alternative embodiment, the system for simulating operation of a crane comprises a simulator device in the form of a pair of virtual reality (VR) glasses 300, see FIG. 7. The general design of the pair of VR glasses 300 is the same as for the computer 200, see FIG. 6, but it will be appreciated that the input device 203 is optional and that the pair of VR glasses 300 usually is powered by means of a battery.

An embodiment of a controller 1 according to the invention has been described above with reference to FIG. 5. In an alternative embodiment, shown in FIG. 8, a second radio control unit 9' is provided for the communication with the crane 100 via a separate antenna 11' when the operation of the crane 100 is controlled. The first radio control unit 9 then operates during simulation when the controller 1 is used together with a simulator device during training. The controller 1 shown in FIG. 8 is designed and functions in all other aspects as the one described above with reference to FIG. 4.

Figure 8:
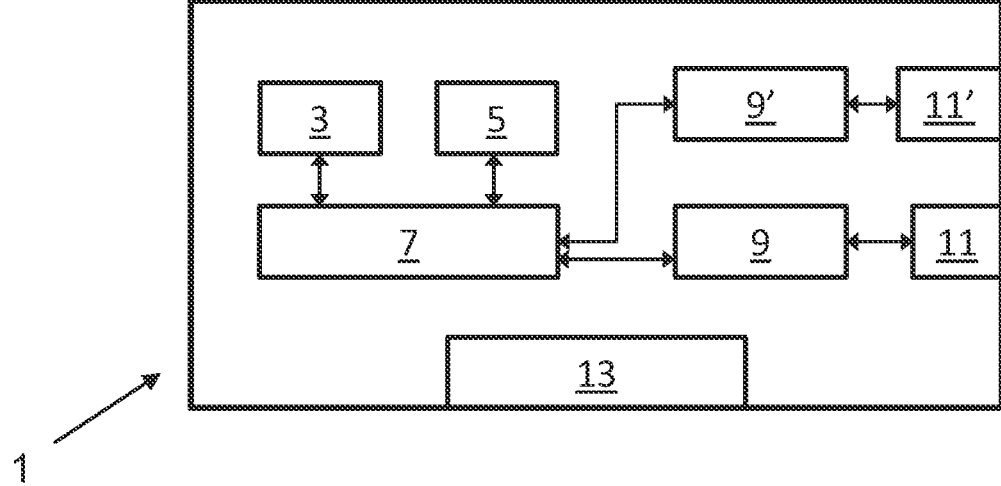
FIG. 8 is a block diagram showing the different components of an alternative embodiment of a controller according to the invention.

Alternatively, in FIG. 8, parts 9' and 11' may represent an interface for communication with a crane via a cable or a wire. In this embodiment, the processing means 7 controls the crane via the interface 9', 11' during operation of the crane 100 and communicates with a simulation device via the radio communication unit 9 and antenna 11 by means of a Bluetooth protocol.

This means that a method according to the invention of operating a controller 1 comprises setting the controller 1 in one of the following modes: an operating mode and a simulation mode. If the controller 1 is in the operating mode, the operation of the crane 100 is controlled. However, if the controller 1 is in the simulation mode, the controller 1 communicates with a simulation device 200; 300 for simulating the operation of a predefined crane.

To implement this, a computer program comprising computer program code is executed on the processor of the processing means 7 of the controller 1 to implement this method.

A simulation device in the form of a computer or a pair of VR glasses has been described. It will be appreciated that any kind of digital device with a capacity of Bluetooth communication, such as a mobile phone, can be used as a simulation device in a system according to the invention for simulating operation of a crane.

The invention claimed is:

1. A controller for controlling the operation of a crane, comprising:
- a control panel for the control of different functions of the crane,
- a two-way communication radio unit adapted to transmit and receive information from/to the controller, and
- a processing means connected to the control panel and the communication radio unit and adapted to control the function of the controller,
- wherein the processing means, when in an operation mode, is adapted to communicate with the crane for controlling the operation of the crane,
- wherein the communication radio unit is adapted to operate in the 2.4 GHz Bluetooth band,
- wherein the processing means, when in a simulation mode, is adapted to communicate via a first communication radio unit, by means of a Bluetooth protocol, with a remote simulator device adapted to simulate the operation of a predefined crane, and
- wherein the controller comprises a second communication radio unit, wherein the processing means is adapted to communicate with the crane during operation thereof by means of the second radio communication unit.

2. The controller according to claim 1, wherein the communication radio unit is adapted to communicate according to the Human Interface Device (HID) protocol.

3. The controller according to claim 1, wherein the processing means, when in a simulation mode, makes use of Generic Attribute profile (GATT-profile).

4. A system for simulating operation of a crane, comprising a simulator device comprising a radio communication unit adapted to operate in the 2.4 GHz Bluetooth band, and
- a controller according to claim 1 adapted to communicate with the simulator device.

5. The system according to claim 4, wherein the simulator device is a computer.

6. The system according to claim 4, wherein the simulator device is a pair of virtual reality (VR) glasses.

7. A method of operating a controller for controlling the operation of a crane by means of the controller, the method comprising the following steps:
- a) setting the controller in one of the following modes: an operating mode and a simulation mode,
- b) if the controller is in the operating mode, controlling the operation of the crane, and
- c) if the controller is in the simulation mode, communicating with a simulation device for simulating the operation of a predefined crane.

8. A computer program product comprising a non-transitory computer storage medium, the non-transitory computer storage medium having the computer program comprising computer program code, the computer program code, if executed on a processor of the processing means of a controller according to claim 1, being adapted to:
- a) set the controller in one of the following modes: an operating mode and a simulation mode,
- b) if the controller is in the operating mode, control the operation of the crane with the second communication radio unit, and
- c) if the controller is in the simulation mode, communicate using the first communication radio unit, by means of the Bluetooth protocol, with a simulation device to simulate the operation of a predefined crane.

* * * * *